May 31, 1960   F. A. E. PORSCHE   2,938,591
DRIVE AGGREGATE FOR MOTOR VEHICLES
Filed Nov. 26, 1956
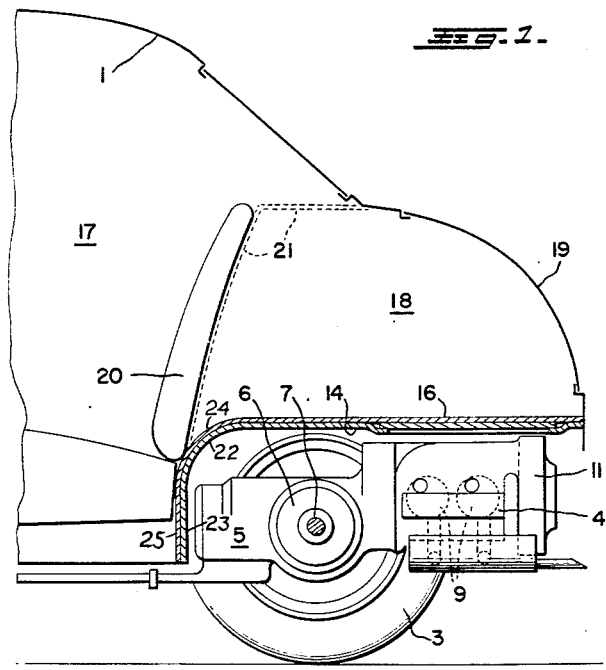
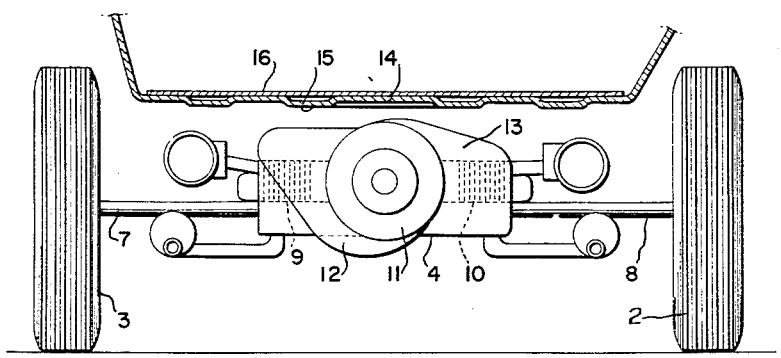
INVENTOR
FERDINAND A.E. PORSCHE
BY  *Dicke and Craig*
ATTORNEYS.

# United States Patent Office 2,938,591
Patented May 31, 1960

2,938,591

DRIVE AGGREGATE FOR MOTOR VEHICLES

Ferdinand A. E. Porsche, Stuttgart, Germany, assignor to Firma Dr. Ing. h.c. F. Porsche KG., Stuttgart-Zuffenhausen, Germany Filed Nov. 26, 1956, Ser. No. 624,444

Claims priority, application Germany Aug. 11, 1956

1 Claim. (Cl. 180—54)

The present invention relates to a drive aggregate for motor vehicles with an internal combustion engine arranged behind the rear axle and a change-speed transmission arranged ahead of the rear axle which are formed into one block or unit with the differential casing.

Prior art constructions are known in which the internal combustion engines are constructed as below-floor-level engines, i.e., engines which are located below the floor of the vehicle. The change-speed transmission is thereby arranged separately from the internal combustion engine at any suitable place below the floor of the vehicle. As it is always desirable from a constructional point of view to keep away from the passenger space the noises which come from and originate at the internal combustion engine and the transmission, large surfaces are necessarily the result of such prior art arrangements which have to be formed in a noise- or sound-absorbing manner. On the other hand, it is always an object in motor vehicle designs to deduce the requirements for the space of the drive aggregate in favor of the useful space of the vehicle.

In a further prior art construction, the internal combustion engine and the change-speed transmission were combined into a single constructional unit at the rear axle while the cooling blower for the air-cooled internal combustion engine is arranged thereabove and is shielded or screened with respect to the interior space of the vehicle by a separating wall. This separating wall forms in part the limiting wall for the luggage space or trunk compartment and for the passenger space of the vehicle. Aside from the fact that the luggage space is thereby considerably reduced in size by the cooling blower, the separating wall, which is set into vibrations by the blower and by the engine, causes the noises produced by these vibrations to reach directly the passenger space of the vehicle. A covering of the walls with sound-absorbing covers, such as mats and the like, does not suffice for purposes of insulation as the body outer wall by means of which the engine aggregate is covered up itself, also vibrates and conducts noises into the passenger space.

Accordingly, it is an object of the present invention to obtain a favorable protection or shielding of the passenger space with respect to noises produced by the drive aggregate combined simultaneously with a space-saving arrangement of the drive aggregate, and to achieve also as large as possible a trunk or luggage space. These objects are attained by the present invention in that the internal combustion engine is formed as an engine provided with approximately horizontally disposed cylinders or rows of cylinders, and the cooling arrangement for the internal combustion engine is arranged laterally thereof, i.e., adjacent the engine as seen either in the rear view or side view thereof in contrast to a location of the cooling arrangement above the engine, in the horizontal plane of the cylinders of the internal combustion engine whereby the entire drive aggregate is covered by a continuous closure wall which forms the floor of the luggage compartment or space. An excellent absorption of the noises is obtained by the provision of a luggage space above the entire drive aggregate and intermediate the drive aggregate and the passenger space properly speaking as the drive aggregate is covered by a wall which is not directly connected with the passenger space. Especially in that no large surfaces of the outer wall of the body are used for purposes of covering the drive aggregate, a transmission of the noises into the passenger space is advantageously avoided.

The internal combustion engine is cooled by means of air and the cooling blower is arranged as a constructional unit with the engine and change-speed transmission below the luggage space. As a result of such a construction, all aggregates and mechanisms which produce noises are combined under the luggage space and may be shielded without difficulty in a noise-absorbing manner with respect to the passenger space. The cooling blower of the internal combustion engine which is formed as a radial blower is arranged at the crankshaft whereby a construction results which is advantageous from a space-saving point of view. The luggage space which is provided above the engine-transmission drive aggregate forms a sound-absorbing space whereby the luggage space which is accessible from the outside thereof is limited with respect to the passenger space by means of a continuous back rest. In order to increase the resistance of the floor of the luggage space against vibrations, the floor is provided with pressed-out indentations or recesses and is provided over the length thereof corresponding to the length of the aggregate disposed therebelow with a sound-absorbing cover, for example, rubber.

Accordingly, it is an object of the present invention to provide a motor vehicle which offers excellent possibilities of noise insulation of the drive aggregate with respect to the passenger space by very simple means.

Another object of the present invention is the provision of a motor vehcile which offers extremely favorable utilization of the space so as to provide as large as possible a trunk or luggage compartment notwithstanding the fact that the drive aggregate is disposed therebelow as a unitary aggregate.

A still further object of the present invention is the provision of a motor vehicle in which the engine, change-speed transmission, and blower for the air-cooled engine are combined into a unit disposed at the rear axle in such a manner that noises emanating therefrom are effectively absorbed before reaching the vehicle passenger space while at the same time shielding the relatively large luggage compartment formed thereabove by a wall which transmits as little as possible of the noises into the passenger space.

These and other objects, features and advantages of the present invention will become more obvious from the following description when taken in connection with the accompanying drawing which shows, for purposes of illustration only, one preferred embodiment in accordance with the present invention, and wherein Figure 1 is a longitudinal cross-sectional view through the rear end of a motor vehicle with a drive aggregate in accordance with the present invention, and Figure 2 is a rear view of the drive aggregate illustrated in Figure 1.

Referring now more particularly to the drawing wherein like reference numerals are used throughout the various views to designate like parts, reference numeral 1 designates the vehicle body which is supported in a known manner on the vehicle wheels 2 and 3. The wheels 2 and 3 are driven from an internal combustion engine 4 over a change-speed transmission in a housing 5 and a differential transmission in a casing 6 by means of swinging half axles 7 and 8 respectively. The internal combustion engine is arranged behind the rear axle formed by the swinging half axles 7 and 8 and is connected to the combined housing 5 of the change-speed transmission with the differential casing 6.

The internal combustion engine is formed as an opposed cylinder-type engine in which the cooling air is supplied by a radial blower 11 located behind the internal combustion engine and driven directly by the crankshaft thereof. The cooling air is conducted from the blower 11 through guide channels formed by sheet metal walls 12 and 13 over the cylinders 9 and 10 and is forced therethrough vertically downwardly. The change-speed transmission housing 5 and the differential gear casing 6 form a unitary structure whereby the change-speed transmission is disposed ahead of the rear axle in the driving direction of the vehicle. The entire drive aggregate, i.e., the internal combustion engine 4 with the blower 11, the change-speed transmission housing 5 and the differential gear casing 6 are covered up by a continuous floor 14 which at the same time forms the floor for the luggage space or trunk compartment. The floor 14 is provided in a known manner with pressed-out recesses or indentations 15 which not only increase the supporting capacity thereof but also prevent vibrations thereof. The floor of the luggage space 14 is further provided, in addition to the usual treatment against droning, with a sound-absorbing cover 16 which is disposed over the entire length of the floor 14 covering the drive aggregate. As shown in Figure 1, the floor 14 is extended by means of curved portion 22 and a transversely extending wall 23, these also being provided with sound-absorbing cover means 24 and 25, the wall forming a separation between the passenger space and the drive aggregate.

An advantageous shielding or screening of the passenger space 17 against the noises of the drive aggregate and internal combustion engine is obtained by the fact that the entire drive aggregate is covered by means of the luggage space floor 14 since the luggage space 18 is inserted between the drive aggregate and the passenger space 17.

The luggage space 18 is closed toward the outside thereof by a lid 19 and is limited with respect to the passenger space 17 by means of a continuous back rest 20 so that the space 18 forms a sound-absorbing space. This space 18 may also be completely separated from the passenger space 17 by a wall 21 and may be used as closed sound-absorbing construction.

Since no further covers, especially those which simultaneously form the vehicle body outer wall are present aside from the floor 14 of the luggge space 18 and its extensions, a transmission of the noises from the drive aggregate 4, 5, 6, 7, 8, 9, 10, 11 and droning of the vehicle body 1 is suppressed in a far reaching manner.

While I have shown and described one preferred embodiment in accordance with the present invention, it is understood that the same is not limited thereto but is susceptible of many changes and modifications within the spirit of the present invention and I intend to cover all such changes and modifications except as defined by the appended claim.

I claim:

A drive aggregate for a motor vehicle having a passenger space with at least one seat and one backrest, and having a luggage compartment and a rear axle, said drive aggregate comprising an internal combustion engine arranged behind said rear axle and a change-speed transmission arranged in front of said rear axle, a differential casing on said rear axle, said internal combustion engine and said change-speed transmission being formed into a single block with said differential casing, said internal combustion engine being of the air-cooled type and including essentially horizontally disposed cylinder means, cooling means for said internal combustion engine including a cooling air blower disposed rearwardly in the axial direction of said internal combustion engine, guide channels for conducting said air from said blower to said cylinder means, said guide channels comprising metal walls extending transversely of said vehicle in substantially opposite directions, and a continuous cover wall provided with sound-absorbing cover means forming the floor of said luggage compartment, a transversely extending wall forming the separation between said passenger space and said drive aggregate, said cover wall extending over the entire drive aggregate including said internal combustion engine, change-speed transmission, axle gear cooling means, said transversely extending wall being connected with said cover wall by a curved portion, said transversely extending wall extending downwardly from said curved portion adjacent said seat, further sound-absorbing cover means on said curved portion and on said transversely extending wall, said transversely extending wall being disposed rearwardly of said seat.

References Cited in the file of this patent

UNITED STATES PATENTS

| 1,974,033 | Nallinger | Sept. 18, 1934 |
| 2,001,029 | Kulick et al. | May 14, 1935 |
| 2,014,670 | Roche | Sept. 17, 1935 |
| 2,035,032 | Wagner | Mar. 24, 1936 |
| 2,087,619 | Howard | July 20, 1937 |
| 2,116,666 | Carlson | May 10, 1938 |
| 2,128,930 | Fageol et al. | Sept. 6, 1938 |
| 2,143,889 | Ledwinka | Jan. 17, 1939 |
| 2,199,517 | Best | May 7, 1940 |
| 2,237,369 | Seyerle | Apr. 8, 1941 |

FOREIGN PATENTS

| 631,145 | Germany | June 13, 1936 |
| 453,387 | Great Britain | Sept. 10, 1936 |
| 872,978 | France | Mar. 2, 1942 |